(12) United States Patent
Day

(10) Patent No.: US 12,323,570 B2
(45) Date of Patent: Jun. 3, 2025

(54) 3D SCANNER-TYPE DEVICE AND METHOD FOR GENERATING A COLORIZED POINT CLOUD

(71) Applicant: Trimble Inc., Westminster, CO (US)

(72) Inventor: Richard Day, Danderyd (SE)

(73) Assignee: Trimble Inc., Westminster, CO (US)

( * ) Notice: Subject to any disclaimer, the term of this patent is extended or adjusted under 35 U.S.C. 154(b) by 26 days.

(21) Appl. No.: 18/235,251

(22) Filed: Aug. 17, 2023

(65) Prior Publication Data

US 2024/0283903 A1 Aug. 22, 2024

(30) Foreign Application Priority Data

Feb. 16, 2023 (EP) .................................... 23157052

(51) Int. Cl.
*H04N 13/257* (2018.01)
*H04N 13/296* (2018.01)
*H04N 23/90* (2023.01)

(52) U.S. Cl.
CPC ......... *H04N 13/257* (2018.05); *H04N 13/296* (2018.05); *H04N 23/90* (2023.01)

(58) Field of Classification Search
None
See application file for complete search history.

(56) References Cited

U.S. PATENT DOCUMENTS

| 2018/0238687 A1* | 8/2018 | Gächter Toya | ....... G01S 7/4817 |
| 2018/0329066 A1 | 11/2018 | Pacala | |
| 2020/0209394 A1* | 7/2020 | Mark | .................... G01S 7/4817 |
| 2021/0096359 A1 | 4/2021 | Klam | |

FOREIGN PATENT DOCUMENTS

WO 2012/168490 A1 12/2012

OTHER PUBLICATIONS

Extended European Search Report for Application No. 23157052.4-1206, mailed Jul. 19, 2023, 6 pages.

* cited by examiner

*Primary Examiner* — Xiaolan Xu
(74) *Attorney, Agent, or Firm* — Kilpatrick Townsend & Stockton LLP

(57) ABSTRACT

The invention relates to a device comprising an alidade rotatably mounted on a base about a vertical axis and to which are attached an electronic distance meter having a horizontal axis and arranged to generate a point cloud, and at least one camera oriented towards an optical system housed in the alidade. Each camera is positioned so that the virtual image of its image nodal point is at the intersection of the vertical and optical axes, and is attached to a platform rotatably mounted about an axis colinear with the vertical axis and passing through the image nodal point. In the scanning mode, each platform rotates at an angular velocity opposite to that of the alidade over a plurality of angular ranges to allow each camera to capture images for colorizing the point cloud.

15 Claims, 4 Drawing Sheets

3D SCANNER-TYPE DEVICE AND METHOD FOR GENERATING A COLORIZED POINT CLOUD

CROSS-REFERENCE TO RELATED APPLICATIONS

The present application claims priority to European Patent Application No. 23157052.4, filed Feb. 16, 2023, the entire contents of which are incorporated herein by reference for all purposes.

FIELD

The field of the invention relates to the colorization of a three-dimensional point cloud of an object or environment, and more particularly to a 3D scanner-type device for the simultaneous acquisition of a three-dimensional point cloud and image capture.

BACKGROUND

Among the known 3D scanning and acquisition techniques, some require direct contact with the object to be analyzed while others do not require any contact. The techniques involving a contact have several drawbacks: they are too slow and unsuitable for fragile objects. These techniques are therefore more and more abandoned in favor of non-contact techniques.

The principle of a non-contact 3D scanner is based on the emission of a laser beam in a given direction and the detection of the diffused laser light (echo) by the target to deduce the relative position of the reflecting point with respect to the 3D scanner.

A time-of-flight 3D scanner includes a laser range finder that calculates the distance to a reflecting point by measuring the time it takes for a laser pulse to do the round trip. Since the speed of light c is known, the round-trip time determines the travel distance of the laser pulse, which is twice the distance between the scanner and the reflecting point.

A triangulation based 3D scanner uses a laser beam to scan an object. A sensor captures the image of the laser spot reflected from the object and calculates the distance between the object and the scanner by triangulation. The distance between the laser source and the sensor is known, as well as the angle between the laser beam and the sensor. As the image of the laser spot is reflected from the scanned object, the scanner can determine the angle at which it returns to the sensor and thus the distance between the laser source and the object surface.

There are also 3D phase shift scanners that modulate the power of the laser beam and measure the phase shift between the emitted and reflected beam.

A 3D scanner measures at regular intervals the position of points on the surface of an object or environment in a system of coordinates and then extrapolates the shape from their distribution to obtain a digital representation of the real object or environment which is called a point cloud. This process is called 3D reconstruction. 3D scans are compatible with Computer Aided Design (CAD) software and 3D printing. A 3D scanner has a very large number of applications, whether in industrial design (automotive, aerospace, medical prostheses), reverse engineering or topographic surveys of an outdoor environment or the interior of a building.

Furthermore, it is particularly advantageous for a 3D scanner to further capture images to colorize the acquired point cloud. This texture added to the point cloud makes it easier to navigate within the point cloud and locate features.

Several solutions have been developed in order to achieve the acquisition of such an augmented point cloud.

A possible solution is based on having a single coaxial camera in a central obscuration of the receiving optics of the electronic distance meter (EDM) of the scanner. The advantage of such a solution is that the images are captured concentrically and are centered on the intersection of the horizontal and vertical axes of the scanner, which allows for easy and good quality reconstruction.

However, the field of view is very limited, both vertically and horizontally, and a high number of snap shots is required. Furthermore, images cannot be captured during scanning or they will be blurred due to the rotational movement of the 3D scanner. A second pass after the scan is therefore necessary in a stop and go mode in both horizontal and vertical directions, which requires a lot of time.

Another solution is based on having a set of cameras positioned off axis of the electronic distance meter, usually in a vertical plane, that can acquire simultaneously a horizontal portion of the field of view. The vertical arrangement of the cameras and their number allow to quickly capture the whole environment.

However, the off-axis placement of the cameras induces parallax errors that must be compensated and make reconstruction difficult. Moreover, as with the solution detailed above, a second pass is necessary after the scan.

The present invention seeks to improve the situation.

SUMMARY

The invention concerns a device for generating a colorized point cloud comprising:
 a base,
 an alidade rotatably mounted on the base about a vertical axis,
 an electronic distance meter attached to the alidade and arranged to generate, by emitting light pulses along a horizontal axis and detecting echoes of the light pulses, a point cloud of an external environment,
 at least one camera attached to the alidade and arranged to capture images of the external environment, each camera having an image nodal point, and
 a control unit arranged to control, in a scanning mode of the device, the rotation of the alidade and the generation, by the electronic distance meter, of a point cloud.

The device further comprises an optical system housed in the alidade.

Each camera is oriented towards the optical system and is positioned so that the virtual image, by the optical system, of the image nodal point of the camera is substantially at the intersection of the vertical axis and the horizontal axis, The device further comprises at least one platform to which the at least one camera is respectively attached, each platform being rotatably mounted about an axis colinear with the vertical axis and passing through the image nodal point of the attached camera.

In the scanning mode, the control unit is arranged, during the rotation of the alidade, to control the rotation of each platform at an angular velocity substantially opposite to that of the alidade over a plurality of angular ranges, to control the capture, by each camera, of an image over each of the angular ranges and to colorize the point cloud using the captured images.

According to an embodiment, the electronic distance meter comprises a light source arranged to emit a light pulse along the horizontal axis, a photodetector arranged to detect an echo of the light pulse and a processor arranged to generate a point cloud of the external environment based on echoes received by the photodetector.

According to an embodiment, a reflective component is rotatably mounted on the alidade and is arranged to reflect the light pulse emitted by the electronic distance meter towards the external environment, and the control unit is arranged to control, in the scanning mode, the rotation of the reflective component.

According to an embodiment, the electronic distance meter is arranged to generate a point cloud of the external environment by time of flight or phase shift measurement.

According to an embodiment, the device comprises at least two cameras each having a respective field of view, and the at least two cameras are positioned so that their respective image nodal points are included in a vertical plane orthogonal to the horizontal axis.

For instance, the projections onto the vertical plane of the respective fields of view of the at least two cameras do not overlap each other.

Alternatively, the projections onto the vertical plane of the respective fields of view of the at least two cameras overlap each other.

According to an embodiment, the optical system comprises, for each camera, a first plane mirror and a second plane mirror.

According to an embodiment, the device further comprises an illumination source arranged on the alidade to illuminate the external environment.

According to an embodiment, the device further comprises a zenith camera rotatably attached to the alidade about the horizontal axis, and the control unit is arranged to control, in the scanning mode, the rotation of the zenith camera to capture a zenith image in a direction colinear with the vertical axis and is arranged to colorize the point cloud using in addition the zenith image.

According to an embodiment, each camera is arranged, in the scanning mode, to capture a burst of images of respective different exposure times over each angular range and to generate a high dynamic range image for each angular range from the corresponding burst.

The invention also relates to a method for generating a colorized point cloud implemented by the above-mentioned device in the scanning mode and comprising the following operations:

rotating the alidade about the vertical axis on the base, and while the alidade is rotating, generating, by the electronic distance meter, a point cloud of an external environment by emitting light pulses and detecting echoes of the light pulses and capturing, by the at least one camera, images of the external environment.

The operation of capturing images of the external environment includes rotating each platform to which a camera is attached at an angular velocity substantially opposite to that of the alidade over a plurality of angular ranges.

The method further comprises an operation of colorizing the generated point cloud using the captured images.

According to an embodiment wherein the device further comprises a zenith camera rotatably attached to the alidade about the horizontal axis, the method further comprises the following operations:

rotating the zenith camera about the horizontal axis, and capturing, by the zenith camera, a zenith image in a direction colinear with the vertical axis.

The operation of colorizing the point cloud is then implemented using in addition the captured zenith image.

According to an embodiment, the operation of generating a point cloud is performed by the electronic distance meter by emitting light pulses along a predetermined set of directions forming a scanning grid.

The operation of rotating the alidade is a 360-degree rotation including:

a first 180-degree rotation during which the electronic distance meter emits light pulses along every other direction of the scanning grid, and a second 180-degree rotation at the beginning of which a delay is introduced so that the device, still by emitting light pulses every other direction, emits light pulses along the remaining directions of the scanning grid.

Finally, the invention also concerns a computer program comprising instructions whose execution, by a computer, results in the implementation of the method described above.

BRIEF DESCRIPTION OF THE DRAWINGS

Other features and advantages of the invention will become apparent from the following description provided for indicative and non-limiting purposes, with reference to the accompanying drawings, wherein.

DETAILED DESCRIPTION

Figure 1:
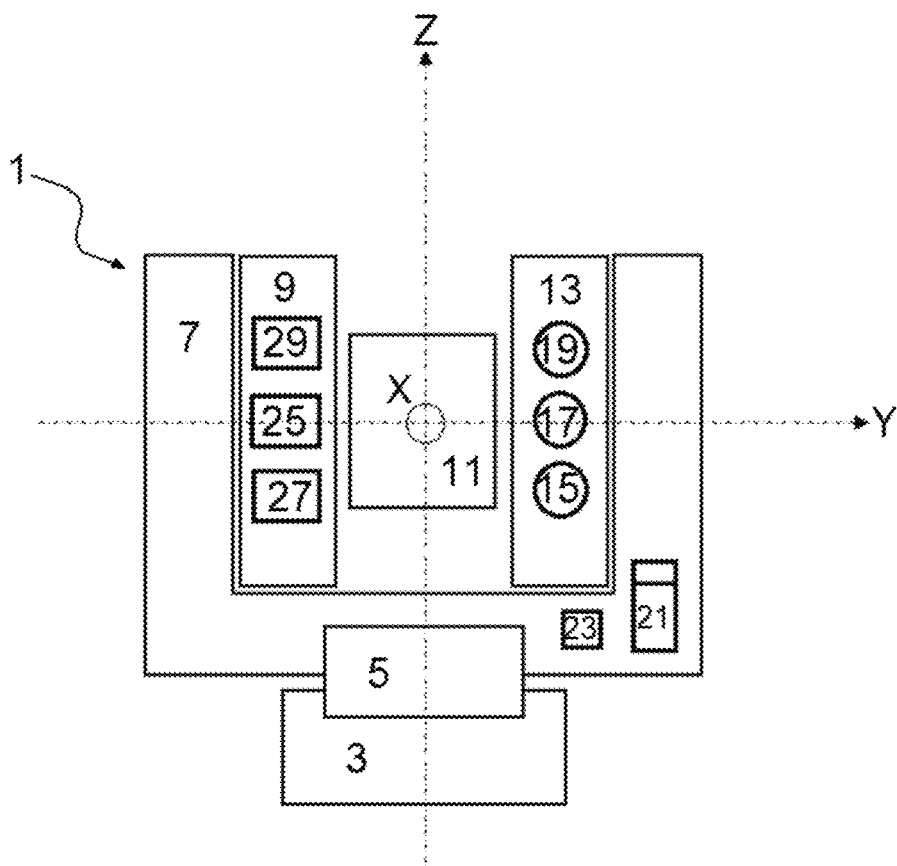
FIG. 1 schematically illustrates a device for generating a colorized point cloud according to the invention.

FIG. 1 represents a device 1 for generating a colorized point cloud.

The device 1 is a 3D scanner-type device. The device 1 allows an operator to collect three-dimensional data of an environment or an object to be scanned and to capture images of such an environment or object in order to generate a colorized point cloud. Such a colorized point cloud can be used for industrial design, reverse engineering or topographic survey purposes. The device 1 is provided with two functions implemented simultaneously and which will be detailed below: a function of generating a point cloud and a function of capturing images. The device 1 is configured to perform an additional function of colorizing the point cloud based on the captured images.

In particular, the colorization of the point cloud provides it with a texture which has the advantage of facilitating the navigation within the point cloud and the detection of features.

In the embodiment illustrated in FIG. 1, the device 1 comprises a base 3, a horizontal motor 5, an alidade 7, an electronic distance meter 9, a reflective component 11, a disk 13 on which are mounted a set of two cameras 15, 17 and a zenith camera 19, a memory 21 and a processor 23.

The alidade 7 is rotatably mounted on the base 3 about a vertical axis Z. To do so, the alidade 7 is coupled to the base 3 via the horizontal motor 5.

Moreover, the alidade 7 is arranged to support or comprise the components of the device 1 necessary to implement the generation and colorization of a point cloud. In a scanning mode of the device 1, the alidade 7 rotates about the vertical axis Z to scan the external environment with a 180-degree rotation in a horizontal plane orthogonal to the vertical axis Z.

The electronic distance meter 9 is attached to the alidade 7 and is arranged to generate a point cloud of the external environment.

The electronic distance meter 9 is arranged to do the acquisition both on a front side and on a rear side of the alidade 7 while the reflective component 11 is rotating about a horizontal Y axis, allowing a full 360-degree coverage in the horizontal plane.

The electronic distance meter 9 can be any non-contact electronic distance meter known in the field of 3D scanning and uses any known measurement process to determine the relative position of a plurality of points of the external environment with respect to the electronic distance meter 9. As an example, the electronic distance meter 9 is arranged to generate a point cloud of the external environment by a time of flight (TOF) measurement. Alternatively, the electronic distance meter 9 may be arranged to generate a point cloud of the external environment by phase shift measurement.

The principle of a non-contact time of flight 3D scanner is based on the emission of a light pulse in a given direction and the detection of the reflected light pulse, also called echo, to deduce the position of the targeted point.

For this purpose and as illustrated in FIG. 1, the electronic distance meter 9 includes a light source 25, a photodetector 27 and a processor 29.

The light source 25 is arranged to emit a light pulse along a horizontal axis Y orthogonal to the vertical axis Z. The light pulse is intended to be reflected by a point in the external environment and to be received as an echo by the electronic distance meter 9, and more precisely by the photodetector 27.

The light source 25 is usually a laser source.

The photodetector 27 is arranged to detect an echo of a light pulse emitted by the light source 25.

Typically, the photodetector 27 comprises at least one photodiode, i.e. a photoelectric detector comprising a semiconductor diode that produces a photoelectric current by absorption of incident optical radiation.

The processor 29 is coupled to the light source 25 and the photodetector 27, and is arranged to generate a point cloud of an external environment based on echoes received by the photodetector 27. For instance, in the case where the electronic distance meter 9 measures a time of flight, the processor 29 measures the time taken by the light pulse to go back and forth between the electronic distance meter 9 and the reflective point of the external environment. From the speed of light c, the electronic distance meter can deduce how far the reflecting point is.

It must be understood here that it is advantageous to emit a high number of light pulses to receive as many echoes and to obtain a point cloud as precise and detailed as possible.

The reflective component 11 is arranged to reflect the light pulse emitted by the light source 25 towards the external environment in a selected direction. To do this, the reflective component 11 is rotatably attached to the alidade 7 and intercepts the horizontal axis Y. As mentioned above, the reflective component 11 can rotate about the horizontal Y axis. The direction in which the light pulse is reflected by the reflective component 11 is designated by an optical axis X which therefore passes through the intersection of the horizontal axis Y and the vertical axis Z. The combination of the rotation of the alidade 7 and the rotation of the reflective component 11 allows a large part of the external environment to be scanned.

The reflective component 11 is for instance a mirror.

The disk 13 is arranged to house one or more cameras, here a set of two cameras comprising the first camera 15 and the second camera 17.

The alidade 7 and the disk 13 are shown separately. However, the disk 13 can be considered as part of the alidade 7, so the cameras 15, 17 are housed in the alidade 7.

Optionally, as shown in FIG. 1, the disk 13 may also house a zenith camera 19, in which case the disk 13 can be a rotating disk arranged to rotate about the horizontal axis Y.

The first camera 15 and the second camera 17 are both arranged to capture an image of the external environment. Such images are intended to be used to colorize the point cloud generated by the electronic distance meter 9.

The arrangement and operation of cameras 15 and 17 are discussed in more detail below with reference to FIGS. 3 and 4.

To improve the visibility of the external environment for the cameras 15, 17, the device 1 can also comprise an illumination source (not shown here), typically formed of a plurality of light-emitting diodes (LEDs). Such an illumination source can be arranged on an outer surface of the electronic distance meter 9.

The zenith camera 19 is optional and is arranged to capture a zenith image of the external environment. To do this, the disk 13 rotates about the axis Y so as to point the zenith camera 19 to a direction colinear with the vertical axis Z. Indeed, this zone of the external environment is generally not accessible to the cameras 15 and 17. The zenith image is for instance captured after the complete 360-degree rotation of the alidade 7 about the vertical axis Z and allows to complete the colorization of the point cloud.

In the example described here, the cameras 15, 17 and the zenith camera 19 are housed in a part of the device 1 that has the general shape of a disk, namely the disk 13. The disk shape is particularly suitable when rotation of this part is required to point the zenith camera 19 towards the zenith area and capture an image thereof. However, this part of the device 1 may have another shape and is therefore not necessarily a disk.

The memory 21 is arranged to store instructions whose execution, by the control unit 23, results in the generation of a colorized point cloud.

The memory 21 can be any data storage medium arranged to receive and store digital data, for instance a hard disk, a semiconductor disk or more generally any computer component dedicated to the storage of data on flash memory. The memory 21 can also be a random access memory (RAM) or a magneto-optical disk. A combination of several types of data storage can also be envisaged.

The control unit 23 is arranged to generate a colorized point cloud of the external environment. The control unit 23 is coupled to the electronic distance meter 9, to the first camera 15, to the second camera 17 and, possibly, to the zenith camera 19. The colorization of a point cloud on the basis of images is known to the person skilled in the art. Such a colorization can be obtained by an image registration between the point cloud and the images captured by the cameras 15, 17 and 19.

More generally, the control unit 23 is arranged to control components of the device 1 in a scanning mode. In particular, the control unit 23 is arranged to control the rotation of the alidade 7 about the vertical axis Z, to control the electronic distance meter 9 for generating the point cloud and to control the cameras 15, 17 for capturing images of the external environment. Advantageously, the control unit 23 is also arranged, in the scanning mode of the device 1, to control the rotation of the disk 13 and the capture, by the zenith camera 19, of a zenith image. Alternatively, the respective fields of view of the cameras 15, 17 and zenith camera 19 may be such that the zenith area can be covered without rotating the disk 13.

Figure 6:
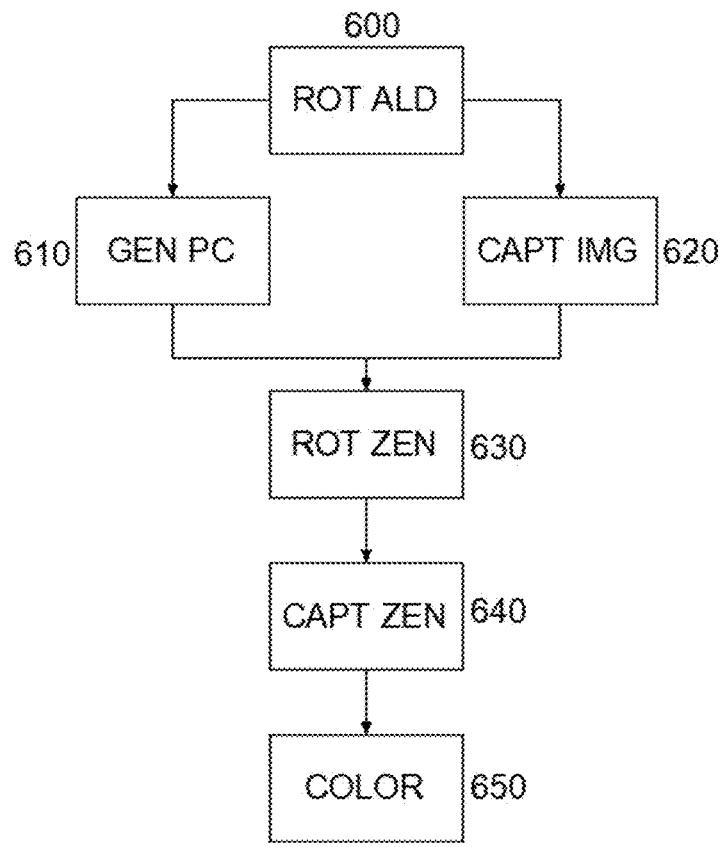
FIG. 6 illustrates a method for generating a colorized point cloud according to the invention.

The control unit 23 can be a microprocessor, a programmable logic device (PLD) or a dedicated chip of field programmable gate array (FPGA) or system on chip (SoC) type, a grid of computer resources, a microcontroller or any other specific form that has the necessary computing power to implement the method of colorizing the point cloud described below with reference to FIG. 6. One or more of these elements can also be implemented in the form of specialized electronic circuits such as an application-specific integrated circuit (ASIC). A combination of processors and electronic circuits can also be envisaged.

The assembly formed by the memory 21 and the control unit 23 can be considered as a computer.

Figure 2:
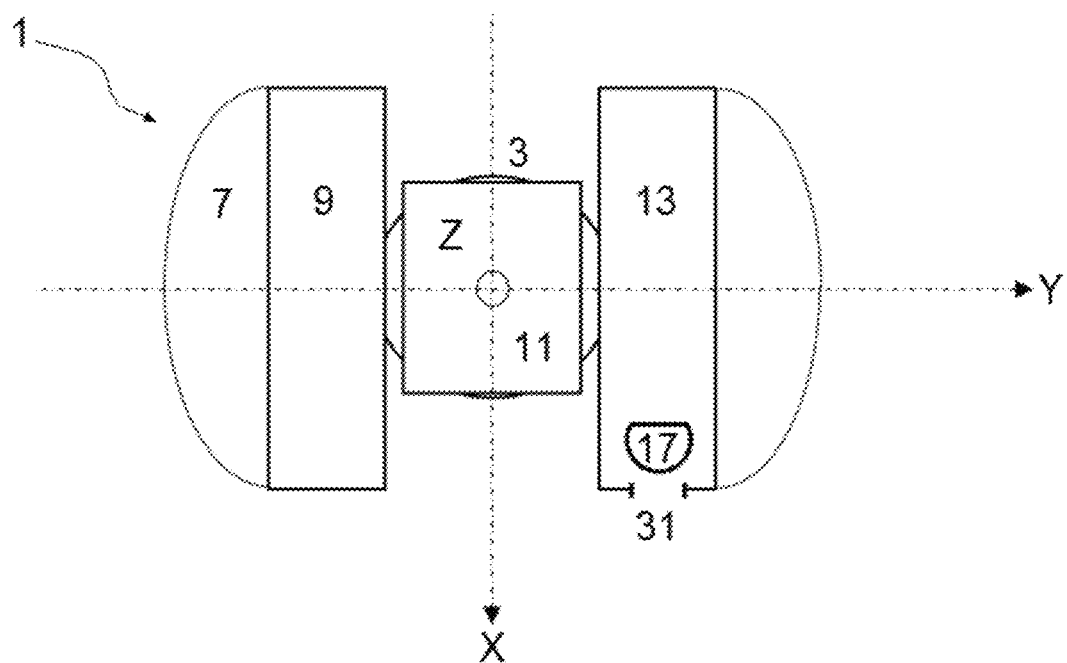
FIG. 2 illustrates the device of FIG. 1 in a horizontal plane.

FIG. 2 shows the device 1 in the horizontal plane XY where only the second camera 17 is visible. Furthermore, the disk 13 has a window 31 allowing the set of two cameras 15, 17 and the zenith camera 19 to capture the external environment. Typically, the window 31 provides an opening angle of approximately 10° to the first camera 15, the second camera 17 and the zenith camera 19.

Figure 3:
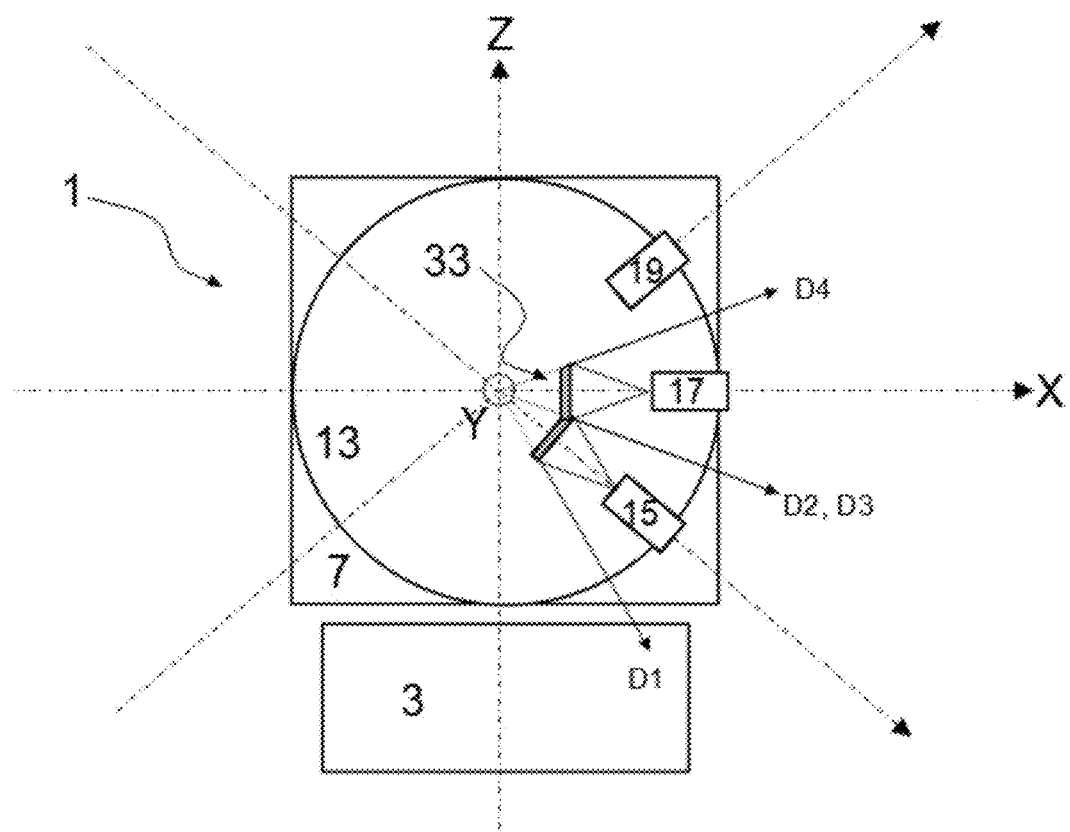
FIG. 3 illustrates the device of FIG. 1 in a vertical plane.

FIG. 3 shows the device 1 in the vertical plane XZ. As illustrated in this figure, the first camera 15 and the second camera 17 are oriented towards the interior of the disk 13 within which they are arranged and not towards the external environment.

Furthermore, an optical system 33 is provided within the disk 13 and is arranged to redirect the field of view of each of the cameras 15, 17 towards the external environment via the window 31.

In FIG. 3, the field of view of each of the cameras 15, 17, and more exactly the projection of the field of view onto the vertical plane XZ, is delimited by solid arrows which correspond to the boundary axes of the fields of view. Thus, the projection of the field of view of the first camera 15 onto the vertical plane XZ is delimited by a lower boundary axis D1 and an upper boundary axis D2, while the projection of the field of view of the second camera 17 onto the vertical plane XZ is delimited by a lower boundary axis D3 and an upper boundary axis D4. As illustrated in FIG. 3, the upper boundary axis D2 of the first camera 15 coincides with the lower boundary axis D3 of the second camera 17. Such a positioning of the cameras 15, 17 makes it possible to avoid overlapping between the respective fields of view of the cameras 15, 17 and therefore to cover a maximum total field of view.

It may however be advantageous, to facilitate further correspondence between the point cloud and the images and thus the colorization of the point cloud, to have an overlap between the fields of view of the cameras.

In the example of FIG. 3, an overlap means that the first camera 15 and the second camera 17 are positioned and oriented such that the upper boundary axis D2 and the lower boundary axis D3 are not coincident. More specifically, in such a case, the upper boundary axis D2 is above the lower boundary axis D3 in the XZ plane, the overlap area of the respective fields of view of the first camera 15 and the second camera 17 being comprised between the lower boundary axis D3 and the upper boundary axis D2.

Figure 4:
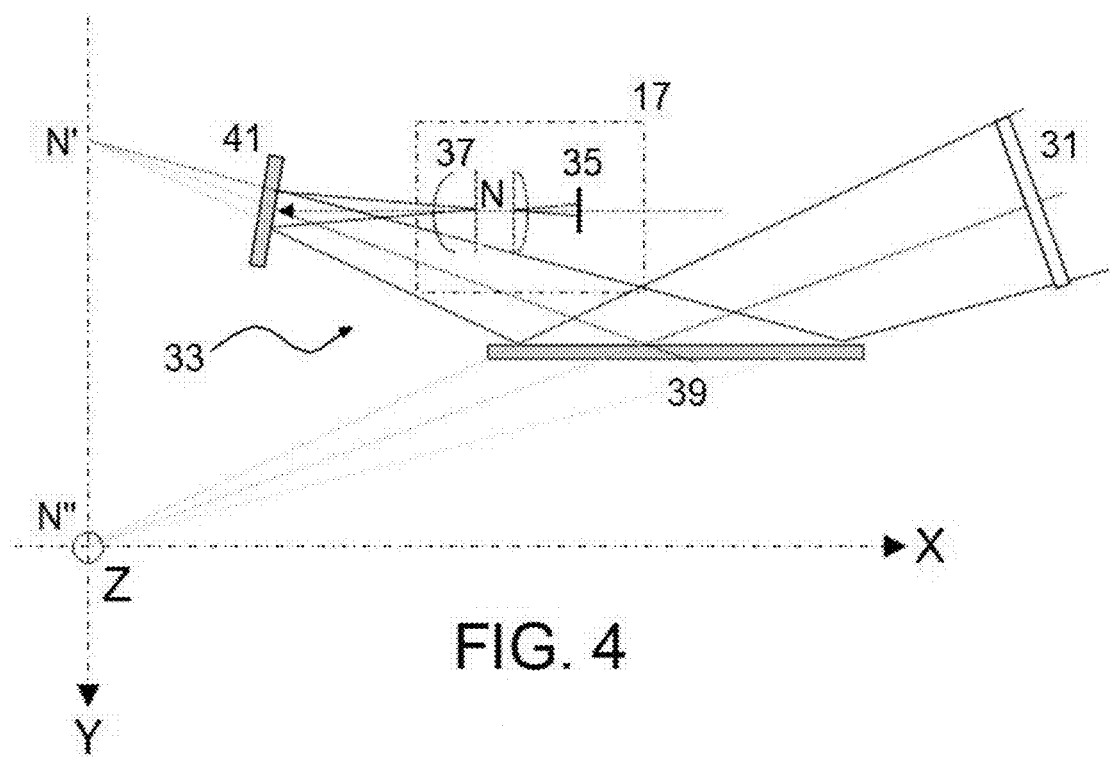
FIG. 4 illustrates a camera and an optical system of the device of FIG. 1 in a horizontal plane.

FIG. 4 illustrates in detail, in the horizontal plane XY, the second camera 17 as well as the optical system 33. It should be understood here that the following description also applies to the first camera 15. The second camera 17, as well as the first camera 15, is not necessary positioned in the horizontal plane XY. For instance, the second camera 17 can be placed in a plane parallel to the horizontal plane XY.

The second camera 17 comprises an image sensor 35 and a camera lens 37.

The image sensor 35 is arranged to receive electromagnetic radiation—and more particularly visible light—coming from the external environment and to convert this radiation into an electrical signal. This electrical signal is intended to be digitized, for instance with an analog-digital converter, then amplified and processed to obtain a digital image.

The image sensor 35 is a conventional image sensor, for example of the CCD (acronym for "charge-coupled device") or CMOS (acronym for "complementary metal-oxide-semiconductor") type.

The camera lens 37 is arranged to concentrate the light rays coming from the external environment towards the image sensor 35. The camera lens 37 typically includes several optical sub-lenses arranged so that their respective optical axes coincide.

In Gaussian optics, the camera lens 37 can, like any optical system, be entirely characterized by a set of points called "cardinal points" and which includes the focal points, the principal points and the nodal points. In the context of the invention, particular consideration is given to the nodal points. Nodal points correspond to a pair of points that includes an image nodal point and an object nodal point.

The nodal points of the camera lens 37 are conjugate points and have the property that an incoming light ray, directed at one of the nodal point, leaves the camera lens 37 with the same direction. In other words, an incident light ray passing through the object nodal point forms with the optical axis of the camera lens 37 an angle of inclination equal to that formed by the light ray emerging from the image nodal point N with the optical axis of the camera lens 37.

In the literature, the reference N is usually reserved for the object nodal point while the reference N' is that of the image nodal point. However, in the context of the invention where only the image nodal point is considered and for the sake of simplification, the image nodal point is the only one present in FIG. 4 and is referenced N.

Here, the optical system 33 comprises a first plane mirror 39 and a second plane mirror 41. The first plane mirror 39 is arranged to reflect the light rays coming from the external environment and passing via the window 31 towards the second plane mirror 41. The second plane mirror 41 is arranged to reflect the light rays coming from the first plane mirror 39 towards the second camera 17, and more precisely the camera lens 37.

Generally speaking, the optical system 33 includes optical components, in particular mirrors and prisms, to redirect the light rays coming from the external environment towards the second camera 17. For example, the first plane mirror 39 and the second plane mirror 41 can each be replaced by a prism.

Furthermore, the second camera 17 and the optical system 33 are arranged so that the virtual image, by the optical system 33, of the image nodal point N is at the intersection of the vertical axis Z and the horizontal axis Y.

Thus, still referring to FIG. 4, the virtual image, by the second plane mirror 41, of the image nodal point N of the camera lens 37 is the point N' located on the horizontal axis Y; and the virtual image, by the first plane mirror 39, of the point N' is the point N" located both on the horizontal axis Y and the vertical axis Z.

Such an optical configuration makes it possible to overcome the parallax errors, i.e. the fact that the external environment is observed by the electronic distance meter 9 and the cameras 15, 17 according to different positions and therefore different points of view. The orientation of the cameras 15, 17 towards the inside of the alidade 7, and more exactly the disk 13, as well as the arrangement of the optical system 33 to cause the positioning of the virtual image of the nodal point image N of the camera lens 37 at the intersection of the vertical axis Z and the horizontal axis Y make it possible to facilitate the image reconstruction and therefore the subsequent colorization of the point cloud. The device 1 is thus able to capture images of the external environment centered on the intersection of the vertical axis Z and the horizontal axis Y.

In the case where the device 1 comprises more than one camera, the cameras can be positioned so that their respective image nodal points N are included in a same vertical plane orthogonal to the horizontal axis Y.

As previously explained, the function of generating a point cloud performed by the electronic distance meter 7 and the function of capturing images of the external environment performed by the cameras 15, 17 are implemented simultaneously.

The construction of the point cloud requires a rotation— and more particularly a 180-degree rotation—of the alidade 7 about the vertical axis Z to scan the whole external environment, and such rotation of the alidade 7 about the vertical axis Z must be extended until a full 360-degree rotation is accomplished to capture images of the whole external environment. However, the capture of an image requires an exposure time and thus a stability of the field of view of the camera to prevent images from being blurred.

Figure 5:
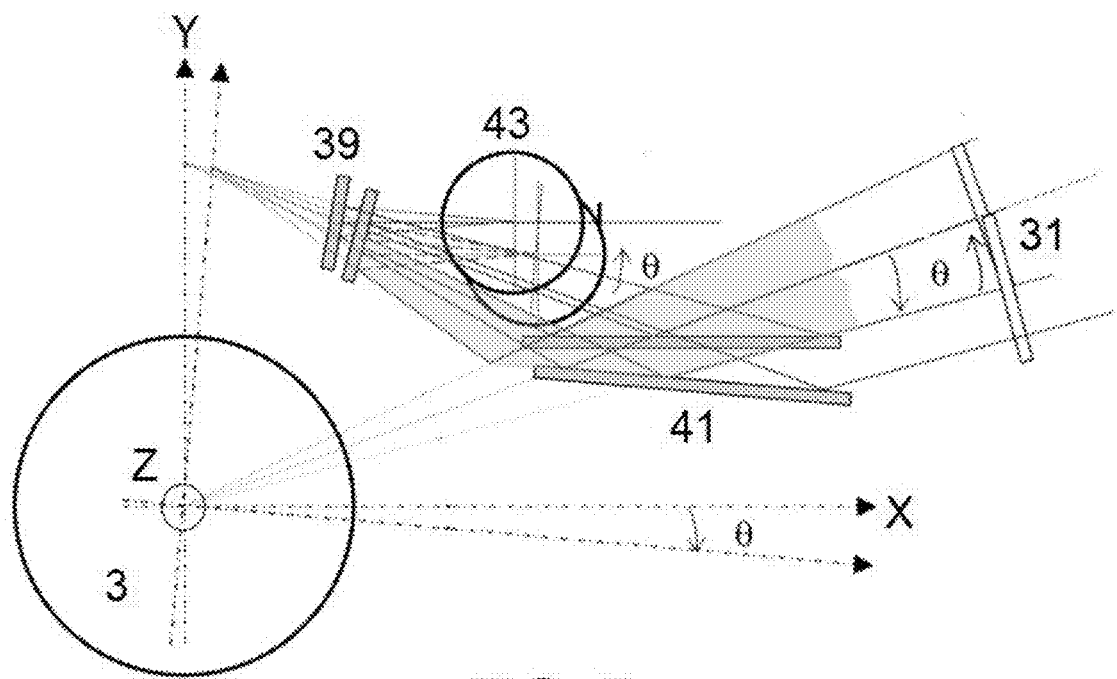
FIG. 5 illustrates a rotation of the device at the level of the camera and the optical system of FIG. 4.

The image stabilization mechanism of the device 1 is illustrated in FIG. 5.

Each camera 15, 17 is attached to a respective platform 43 rotatably mounted about an axis colinear with the vertical axis Z. Each platform 43 is arranged to rotate while the alidade 7 is rotating about the vertical axis Z. To ensure the stability of the field of view of each camera 15, 17, each platform 43 is arranged to rotate at an angular velocity substantially opposite to that of the alidade 7.

The term "substantially" here means that the angular velocity of each platform 43 is advantageously strictly opposite to that of the alidade 7. However, in practice, inaccuracy can occur so that the actual angular velocity of the platform 43 may slightly deviate from the angular velocity opposite to that of the alidade 7.

In FIG. 5, only one platform 43 is shown. However, it is understood here that there are as many platforms as there are cameras.

Furthermore, to ensure that the images remain centered on the intersection of the vertical axis Z and the horizontal axis Y, it is necessary that the respective image nodal point N of each camera 15, 17 remains stationary relative to the optical system 33. To do this, each camera 15, 17 is positioned on its respective platform 43 so that the axis of rotation of the platform 43 passes through the image nodal point N.

In FIG. 5, the device 1 rotates about the vertical axis Z by an angle θ which is compensated by the platform 43. Since each camera 15, 17 must capture multiple images during the rotation of the alidade 7, each platform 43 is arranged to compensate for the rotation of the alidade 7 over a plurality of angular ranges.

A method for generating a colorized point cloud of an external environment implemented by the device 1 will now be described with reference to FIG. 6. More particularly, such a method is implemented by the processing unit 23 when it executes the instructions stored in the memory 21.

In an operation 600, the alidade 7 starts to rotate about the vertical axis Z on the base 3.

The method of colorizing a point cloud described here is implemented throughout the rotation of the alidade 7. Such a rotation is preferably a 360-degree rotation to obtain a complete view of the external environment. Moreover, the rotation of the alidade 7 is advantageously continuous for the sake of efficiency and time saving. Typically, the angular velocity of the alidade 7 is between 2 and $4°·s^{-1}$. The angular velocity of the alidade 7 is for instance substantially equal to $3°·s^{-1}$.

In an operation 610, the electronic distance meter 9 generates a point cloud of the external environment by the emission of light pulses and the reception of echoes of the light pulses.

As mentioned above, the light pulses are emitted by the light source 25 towards the reflective component 11, which reflects the light pulses towards the external environment. The light pulses are reflected and received as echoes by the photodetector 27. The processor 27 generates the point cloud progressively, as the alidade 7 rotates around the vertical axis Z.

The reflective component 11 is positioned facing the light source 25 and rotates about the Y axis to reflect the light pulses on both sides of the device 1. The reflective component 11 thus provides the electronic distance meter 9 with a 360-degree coverage of the external environment after only half a rotation of the alidade 7. In other words, the point cloud can be generated by the electronic distance meter 9 as soon as the alidade 7 has achieved a 180-degree rotation.

The complete 360-degree rotation of the alidade 7 allows the cameras 15, 17 to capture images of the whole external environment.

This results in a drawback, i.e. the device 1 needs twice as much time as a conventional scanner that does not implement a function of colorizing the point cloud. Indeed, such a conventional scanner only performs a 180-degree rotation since it does not capture images of the external environment.

Figure 7:
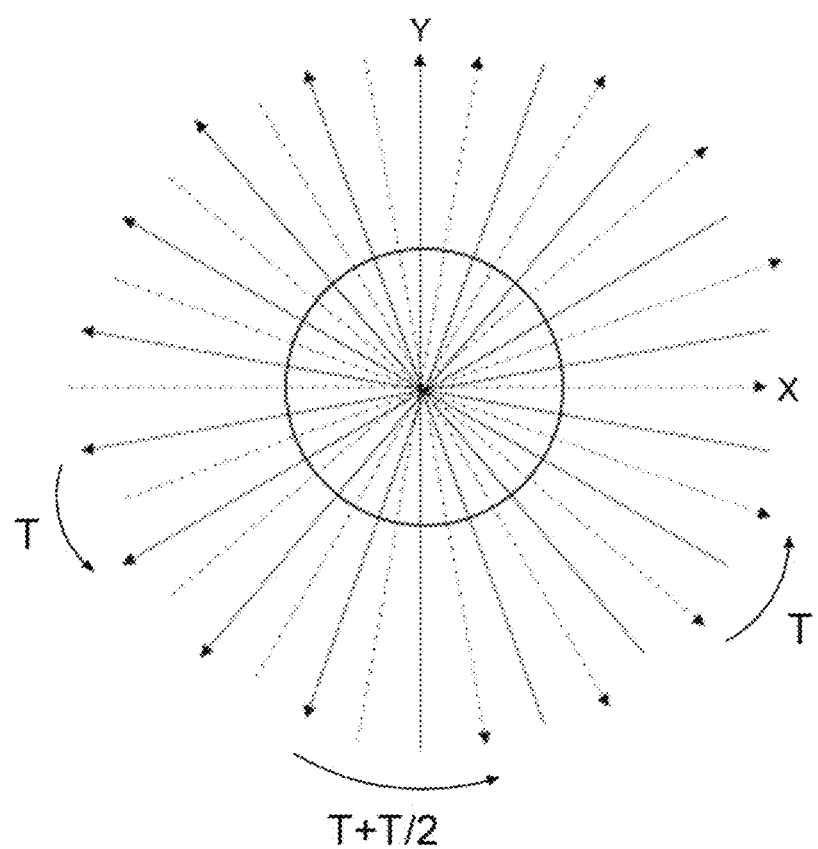
FIG. 7 illustrates a scanning grid according to an embodiment of the method of FIG. 6.

FIG. 7 illustrates an embodiment in which this drawback is remedied.

More particularly, FIG. 7 illustrates a scanning grid, i.e. a set of directions along which light pulses are successively reflected. Here, the scanning grid is projected onto the horizontal XY plane and each direction of reflection of the light pulses is represented by a solid line or a dotted line with an arrow. As previously explained, a 180-degree rotation is sufficient in conventional operation since, for each direction of the scanning grid, the light pulses are emitted in both directions, i.e. on both sides of the device 1.

However, in the embodiment shown in FIG. 7, the electronic distance meter 9 operates differently. The 360-degree rotation of the alidade 7 is divided into two phases: a first 180-degree rotation and a second 180-degree rotation. In this embodiment, the angular velocity of the alidade 7 is doubled.

The operation of the cameras 15, 17 and of their respective platforms 43 is unchanged and is therefore not discussed here.

During the first 180-degree rotation, the electronic distance meter 9 scans every other direction. In FIG. 7, where the alidade 7 rotates counterclockwise, the corresponding directions of the scanning grid are those shown by solid lines. A period of time T elapses between two consecutive scanned directions. At the end of this first 180-degree rotation, the electronic distance meter 9 has therefore scanned half of the external environment since light pulses have been reflected along every other direction.

At the beginning of the second 180-degree rotation, the control unit 23 controls the electronic distance meter 9 to add a delay in the emission of light pulses. This additional delay is substantially equal to T/2. The operation of the electronic distance meter 9 during the second 180-degree rotation is then identical to that of the first 180-degree rotation. In other words, the light pulses are emitted along every other direction of the scanning grid and a period of time T elapses between two consecutive scanned directions. The additional delay T/2 introduced at the very beginning of the second 180-degree rotation allows to scan the directions of the scanning grid shown by dotted lines and thus to fill the gaps of the first 180-degree rotation.

Referring again to FIG. 6, each camera 15, 17 capture images of the external environment in an operation 620.

More particularly, the control unit 23 rotates each platform 43 to which a camera 15, 17 is attached at an angular velocity substantially opposite to that of the alidade 7 over a plurality of angular ranges and controls the capture, by each camera 15, 17, of an image over each angular range.

As previously mentioned, the angular velocity of the alidade 7 is typically between 2 and $4°·s^{-1}$, for instance substantially equal to $3°·s^{-1}$. Therefore, if the exposure time required to capture an image is 2 seconds, it means that each platform 43 compensates for the rotation of the alidade 7 over an angular range of 6° for 2 seconds. Each platform 43 thus rotates at an angular velocity substantially equal to $-3°·s^{-1}$. The compensation of the rotation of the alidade 7 by each platform 43 allows each camera 15, 17 to stay oriented in a fixed direction over each angular range.

The simultaneous rotations of the alidade 7 and of each platform 43 are carried out over angular ranges each corresponding to a small rotation angle because of the constraints related, among others, to the volume allocated to each camera 15, 17 within the device 1, and more exactly within the disk 13, to the width of the window 31 which limits the horizontal field of view—typically 10°—and to the size of the optical components of the optical system 33. Furthermore, the exposure time of each camera 15, 17 can be reduced to minimize the impact of noise on the captured image.

Thus, image acquisition is performed for each camera 15, 17 every 360°/n—or 2π/n radians—, where n is an integer generally between 20 and 40. Each image is captured on a vertical band corresponding to the window 31 and offering a horizontal field of vision of approximately 10°.

The rotation of the platform 43 allows each camera 15, 17 to be stable and to keep the same field of view during the period of time necessary to capture an image.

Typically, the projection of the field of view of each camera 15, 17 onto the vertical plane XZ covers an angle of between 60 and 75°, for example substantially equal to 67.5°. In the configuration of FIG. 3 where the respective fields of view of cameras 15, 17 are complementary and both cover an angle substantially equal to 67, 5°, the two cameras 15 and 17 together cover a total angle of 135° on one side of the device 1 in the vertical plane XZ. Consequently, a 360-degree rotation of the alidade 7 covers both sides of the device 1 to obtain a 270-degree coverage in the vertical plane XZ.

The stability of each camera 15, 17 over each angular range allows to capture several instantaneous images—or snap shots—of the same area of the external environment. Furthermore, it is known that multiple images of an image burst can have different respective exposure times to improve the quality of the single image reconstructed from the image burst. It is thus possible to obtain a high dynamic range (HDR) type image. The total time, typically of the order of 2 seconds, offered to each camera 15, 17 to capture an image over each angular range thanks to the opposite rotation of the corresponding platform 43 allows to obtain HDR images.

Optionally, for instance after the complete rotation of the alidade 7, the following operations 630 and 640 are performed for capturing a zenith image.

In the operation 630, the zenith camera 19 rotates about the horizontal axis Y. More particularly, the control unit 23 controls the rotation of the disk 13 to which the zenith camera 19 is attached.

In an operation 640, the zenith camera 19 captures an image in a direction colinear with the vertical axis Z. Typically, the zenith camera 19 has a field of view whose angle is substantially equal to 70°.

As mentioned above, the cameras, including the zenith camera 19, may have respective fields of view such that no rotation of the disk 13 is required to cover and thus capture the zenith area.

Finally, in an operation 650, the control unit 23 colorizes the point cloud using the captured images and, if applicable, the zenith image.

The invention claimed is:

1. A device for generating a colorized point cloud comprising:
    a base;
    an alidade rotatably mounted on said base about a vertical axis (Z);
    an electronic distance meter attached to the alidade and configured to generate, by emitting light pulses along a horizontal axis (Y) and detecting echoes of said light pulses, a point cloud of an external environment;
    at least one camera attached to the alidade and configured to capture images of said external environment, each camera having an image nodal point (N); and
    a control unit configured to control, in a scanning mode of the device, a rotation of the alidade and the generation, by the electronic distance meter, of a point cloud;
    wherein said device further comprises an optical system housed in the alidade;
    wherein each camera is oriented towards said optical system and is positioned so that the virtual image, by said optical system, of the image nodal point (N) of said camera is substantially at the intersection of the vertical axis (Z) and the horizontal axis (Y);
    wherein said device further comprises at least one platform to which the at least one camera is respectively attached, each platform being rotatably mounted about an axis colinear with the vertical axis (Z) and passing through the image nodal point (N) of the attached camera;
    wherein, in the scanning mode, the control unit is configured, during the rotation of the alidade, to control a rotation of each platform at an angular velocity substantially opposite to that of the alidade over a plurality of angular ranges to compensate for the rotation of the alidade and allow each camera to stay oriented in a fixed direction, to control the capture, by each camera, of an image over each of said angular ranges, and to colorize the point cloud using the captured images.

2. The device of claim 1, wherein the electronic distance meter comprises a light source configured to emit a light pulse along the horizontal axis (Y), a photodetector configured to detect an echo of said light pulse and a processor configured to generate a point cloud of the external environment based on echoes received by the photodetector.

3. The device of claim 1, wherein a reflective component is rotatably mounted on the alidade and is arranged to reflect the light pulse emitted by the electronic distance meter towards the external environment, and wherein the control unit is configured to control, in the scanning mode, the rotation of said reflective component.

4. The device of claim 1, wherein the electronic distance meter is configured to generate a point cloud of the external environment by time of flight or phase shift measurement.

5. The device of claim 1, wherein the device comprises at least two cameras each having a respective field of view, and wherein said at least two cameras are positioned so that their respective image nodal points (N) are included in a vertical plane orthogonal to the horizontal axis (Y).

6. The device of claim 5, wherein the projections onto the vertical plane of the respective fields of view of said at least two cameras do not overlap each other.

7. The device of claim 1, wherein the projections onto the vertical plane of the respective fields of view of said at least two cameras overlap each other.

8. The device of claim 1, wherein the optical system comprises, for each camera, a first plane mirror and a second plane mirror.

9. The device of claim 1, further comprising:
an illumination source arranged on the alidade to illuminate the external environment.

10. The device of claim 1, further comprising:
a zenith camera rotatably attached to the alidade about the horizontal axis (Y), and wherein the control unit is configured to control, in the scanning mode, the rotation of said zenith camera to capture a zenith image in a direction colinear with the vertical axis (Z) and is configured to colorize the point cloud using in addition the zenith image.

11. The device of claim 1, wherein, in the scanning mode, each camera is configured to capture a burst of images of respective different exposure times over each angular range and to generate a high dynamic range image for each angular range from the corresponding burst.

12. A method for generating a colorized point cloud implemented by the device in the scanning mode of claim 1 and comprising the following operations:
rotating the alidade about the vertical axis (Z) on the base, and while said alidade is rotating, generating, by the electronic distance meter, a point cloud of an external environment by emitting light pulses and detecting echoes of said light pulses and capturing, by the at least one camera, images of said external environment, wherein capturing images of the external environment includes rotating each platform to which a camera is attached at an angular velocity substantially opposite to that of the alidade over a plurality of angular ranges to compensate for the rotation of the alidade and allow each camera to stay oriented in a fixed direction; and colorizing the generated point cloud using the captured images.

13. The method of claim 12, the device further comprising a zenith camera rotatably attached to the alidade about the horizontal axis (Y), the method further comprising:
rotating the zenith camera about the horizontal axis (Y); and
capturing, by the zenith camera, a zenith image in a direction colinear with the vertical axis (Z);
the operation of colorizing the point cloud being implemented using in addition the captured zenith image.

14. The method of claim 12, wherein generating a point cloud is performed by the electronic distance meter by emitting light pulses along a predetermined set of directions forming a scanning grid, and wherein rotating the alidade is a 360-degree rotation including:
a first 180-degree rotation during which the electronic distance meter emits light pulses along every other direction of the scanning grid, and
a second 180-degree rotation at the beginning of which a delay is introduced so that the device, still by emitting light pulses every other direction, emits light pulses along the remaining directions of the scanning grid.

15. A non-transitory computer-readable medium comprising instructions whose execution, by a computer, results in the implementation of the method of claim 12.

* * * * *